United States Patent
Tawil et al.

(10) Patent No.: US 7,356,728 B2
(45) Date of Patent: Apr. 8, 2008

(54) REDUNDANT CLUSTER NETWORK

(75) Inventors: Ahmad H. Tawil, Round Rock, TX (US); Kevin T. Marks, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 355 days.

(21) Appl. No.: 10/876,428

(22) Filed: Jun. 24, 2004

(65) Prior Publication Data

US 2005/0289386 A1  Dec. 29, 2005

(51) Int. Cl.
*G06F 11/00* (2006.01)

(52) U.S. Cl. .................... 714/5; 714/6; 711/114
(58) Field of Classification Search ............. 714/6, 714/5; 711/114
See application file for complete search history.

(56) References Cited

U.S. PATENT DOCUMENTS

| | | | |
|---|---|---|---|
| 7,058,848 B2* | 6/2006 | Sicola et al. ............... | 714/4 |
| 2004/0006587 A1 | 1/2004 | McConnell et al. ......... | 709/202 |
| 2005/0015655 A1* | 1/2005 | Clayton et al. .............. | 714/6 |
| 2005/0066100 A1* | 3/2005 | Elliott et al. ............... | 710/300 |
| 2005/0071532 A1* | 3/2005 | Bakke et al. ............... | 710/300 |
| 2005/0080881 A1* | 4/2005 | Voorhees et al. ........... | 709/220 |
| 2005/0228943 A1* | 10/2005 | DeCenzo et al. ........... | 711/114 |

OTHER PUBLICATIONS

RAID Levels 0+1 (01) and 1+0 (10), Apr. 17, 2001, The PC Guide, Version 2.2.0, http://www.pcguide.com/ref/hdd/perf/raid/levels/multiLevel01-c.html.*

* cited by examiner

*Primary Examiner*—Marc Duncan
(74) *Attorney, Agent, or Firm*—Baker Botts L.L.P.

(57) ABSTRACT

A cluster network is disclosed in which of the storage drives of the network are distributed across the nodes of the network. Data is stored to the drives of the network according to a RAID storage methodology and without the necessity for shared external storage.

31 Claims, 4 Drawing Sheets

REDUNDANT CLUSTER NETWORK

CROSS-REFERENCE TO RELATED APPLICATIONS

This application is related by subject matter to U.S. application Ser. No. 10/188,644, filed Jul. 2, 2002, and titled "Information Handling System and Method for Clustering with Internal Cross Coupled Storage," which is incorporated by reference herein in its entirety and for all purposes.

TECHNICAL FIELD

The present disclosure relates generally to the field of storage and computer networks, and, more particularly, to a redundant cluster network having shared storage.

BACKGROUND

As the value and use of information continues to increase, individuals and businesses continually seek additional ways to process and store information. One option available to users of information is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary with regard to the kind of information that is handled, how the information is handled, how much information is processed, stored, or communicated, and how quickly and efficiently the information may be processed, stored, or communicated. The variations in information handling systems allow for information handling systems to be general or configured for a specific user or specific use, including such uses as financial transaction processing, airline reservations, enterprise data storage, or global communications. In addition, information handling systems may include a variety of hardware and software components that may be configured to process, store, and communicate information and may include one or more computer systems, data storage systems, and networking systems.

Independent server computers may be grouped in a cluster and managed as a single system to provide a network that is characterized by higher availability, manageability, and scalability, as compared with groupings of unmanaged servers. A server cluster typically involves the configuration of a group of independent servers such that the servers appear in the network as a single machine or unit. Server clusters are managed as a single system to tolerate component failures and to support the addition or subtraction of components in the cluster in a transparent manner. At a minimum, a server cluster includes two or more servers, which are sometimes referred to as nodes, and that are connected to one another by a network or other communication links. A cluster network typically involves a shared storage network that is accessible by each node of the cluster network so that, when a node fails, a surviving node can assume the responsibilities of the failed node, including accessing the storage resources of the failed node. Shared storage, however, generally involves the use of external storage, which is expensive and requires its own set of redundant features.

SUMMARY

In accordance with the present disclosure, a redundant cluster network and method for using the same are disclosed in which the drives of the network are distributed across the nodes of the network and data is stored to those drives according to a mirrored, fault tolerant storage methodology. The system and method disclosed herein is advantageous because it reduces or eliminates the necessity and usefulness of an external shared storage system. The data of the cluster network is stored across the nodes of the network. Through the use of a mirrored, fault tolerant storage methodology, data redundancy is accomplished in the data storage of the cluster network. If a drive of a node fails, the multiple RAID controllers of the cluster network may access mirrored data through a corresponding drive in a node of the network. If an entire node fails, the mirrored data set is included in the surviving node of the cluster network.

The cluster network and method for use disclosed herein is advantageous because it introduces an architecture that promotes failure recovery schemes, while relying on existing storage technology and allowing the use of the architecture to avoid the use of expensive external storage technology. The cluster network and method disclosed herein is also advantageous because it will accommodate the use of either SAS drives, with or without the use of an SAS expander in each node of the network, or Serial ATA drives, with the possible addition of a multiplexer for each Serial ATA drive to establish dual ports for each Serial ATA drive. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. An information handling system may comprise one or more nodes of a cluster network.

The system and method disclosed herein involves a shared storage technique for highly available clustered nodes that employs the existing components and internal storage of one or more server computers. The shared storage technique disclosed herein does not involve the use of external shared storage system. Rather, a RAID topology is overlaid across the storage drives of multiple server nodes of a cluster network, eliminating the necessity of a highly available, external storage system and the cost associated with such a system.

Figure 1:
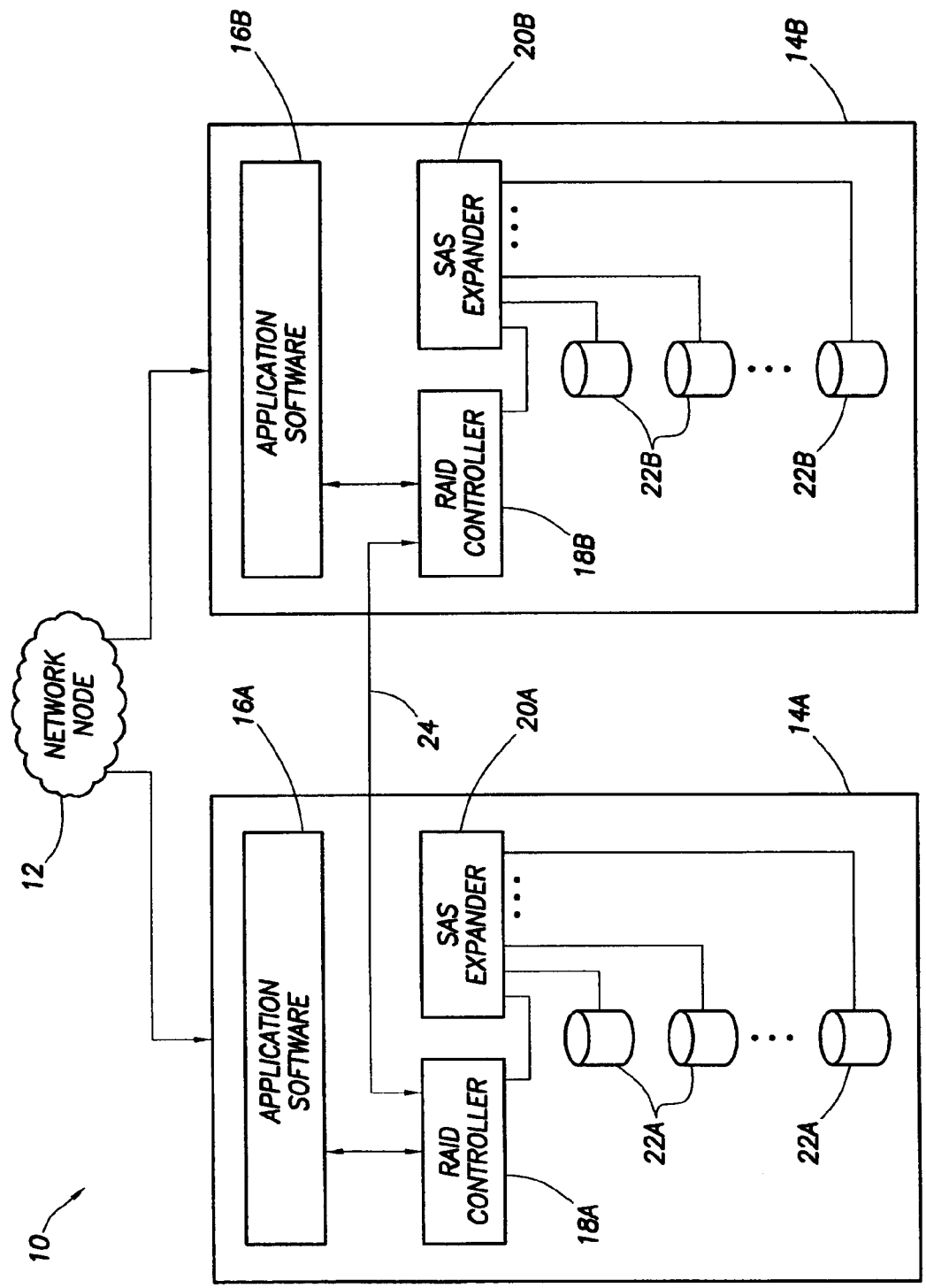
FIG. 1 is a diagram of a cluster network.

Shown in FIG. 1 is a diagram of a two-node server cluster network, which is indicated generally at 10. Cluster network 10 is an example of a highly available cluster implementation. Server cluster network 10 includes server node 14A and server node 14B, which are interconnected to one another by a communications link 24. Each of the server nodes 14A and 14B are coupled to a network node 12, which represents a connection to a communications network. Because each of the nodes 14A and 14B shown in FIG. 1 has identical internal components, the components will be described once and without reference to the "A" and "B" designations that are shown in FIG. 1. Each of nodes 14A and 14B includes an instance of application software 16, which may comprise any software tool or application that allows a client of the network to save data to or retrieve data from storage. Each instance of application software 16 is coupled to a RAID controller 18. The RAID controllers of each of the server nodes are coupled to one another by communications link 24. Another output of each RAID controller 18 is coupled to SAS expander 20, which is an edge expander includes serial point-to-point communications links to each of a plurality of drives 22. Drives 22 may comprise SAS drives or Serial ATA drives.

In the architecture of FIG. 1, RAID controllers 18A and 18B are peers of one another. A RAID 1 topology is applied across the drives of server node 14 and across the drives of server node 14B. According to a RAID 1 storage scheme, data in a drive on a first node is mirrored in a corresponding drive on a second node. In the example of FIG. 1, each content of each of drives 22A in server node 14A will be mirrored in a drive 22B in server node 14B. Because of the necessity of maintaining the same set of content in the corresponding drives in each of the server nodes, changes to a drive in a server node will have to be reflected in the corresponding drive in the second server node. The updating of the content of the drives of the server nodes is managed by RAID controllers 18A and 18B. Once a modification is made to a drive of a server node, the affected RAID controller communicates data concerning the modifications across communications link 24 to the peer RAID controller, which then updates the corresponding drive of the server node managed by the RAID controller. As such, a write to a drive of server node 14A results in a corresponding write to the corresponding drive in server node 14B.

The presence of like data on corresponding drives of each of the server nodes allows for redundancy at the drive level and at the server node level. If a single drive of a server node were to fail, the RAID controller of the affected node could access the data of the failed drive through the data residing in the peer or corresponding drive in the other server node. As an example of drive level redundancy, if a drive 22A were to fail in server node 14A, RAID controller 18A could fail over to the corresponding mirrored drive 22B in server node 14B. At the server node level, the failure of the entire server node 14 would not compromise the data integrity of the network, as a complete set of the data of the network is included in each server node of the network. After the replacement of a failed drive or server node, the RAID controller of the failed drive or server will synchronize the content of the failed drive or all drives, in the case of the failure of the entire server node, with the assistance of the peer RAID controller and the content of the drives in the non-failing server node.

Figure 2:
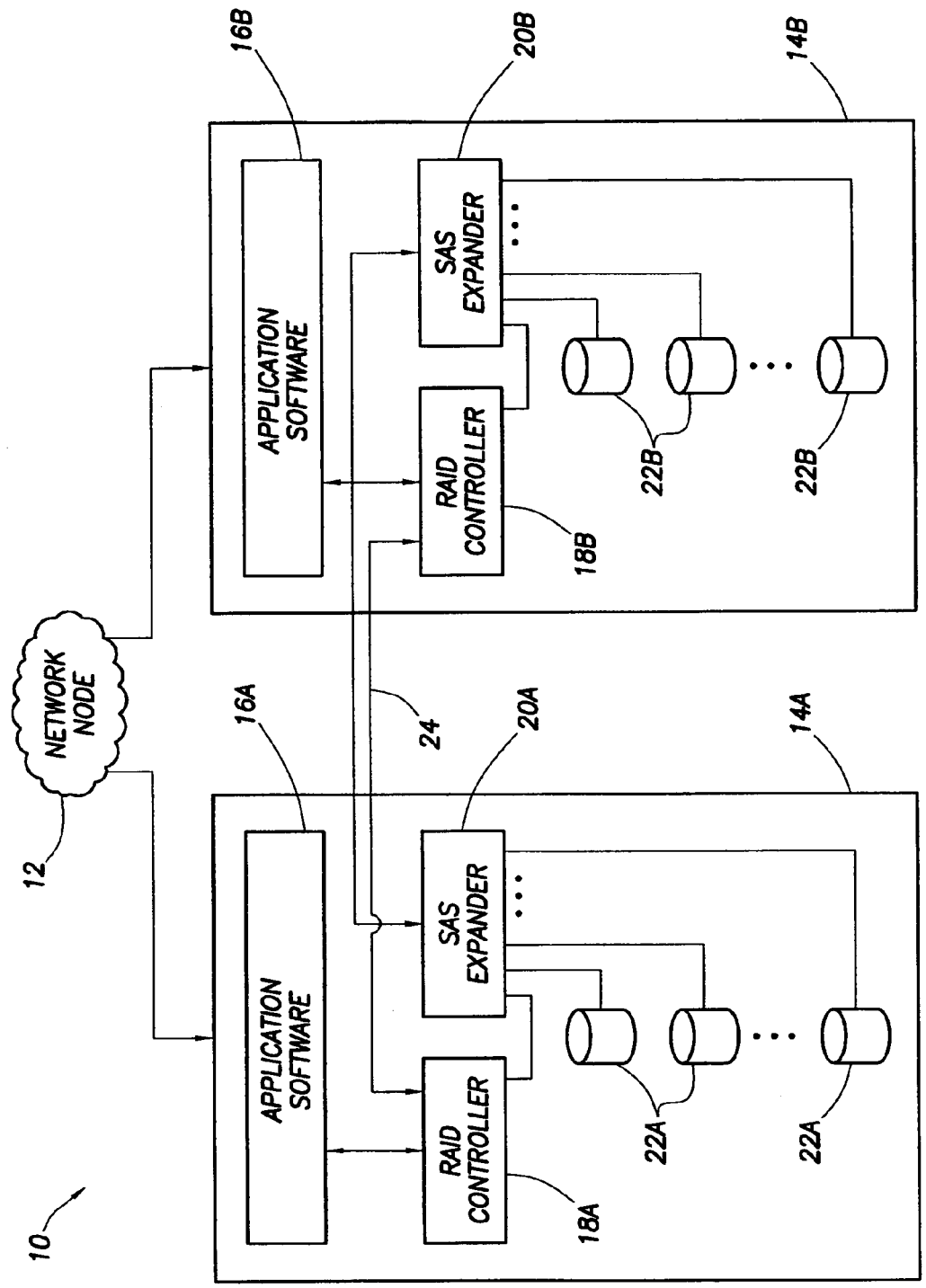
FIG. 2 is a diagram of a cluster network having an SAS expander.

Communications link 24 will typically be a higher capacity link, such as a 4X link, to accommodate the volume of traffic to be passed between the peer RAID controllers of the network. Shown in FIG. 2 is an alternate version of the cluster network of FIG. 1. The architecture of the network of FIG. 2 is like that of FIG. 1, with the addition that the architecture of FIG. 2 includes an additional communications link between SAS expander 20A of server node 14A and SAS expander 20B of server node 14B.

Figure 3:
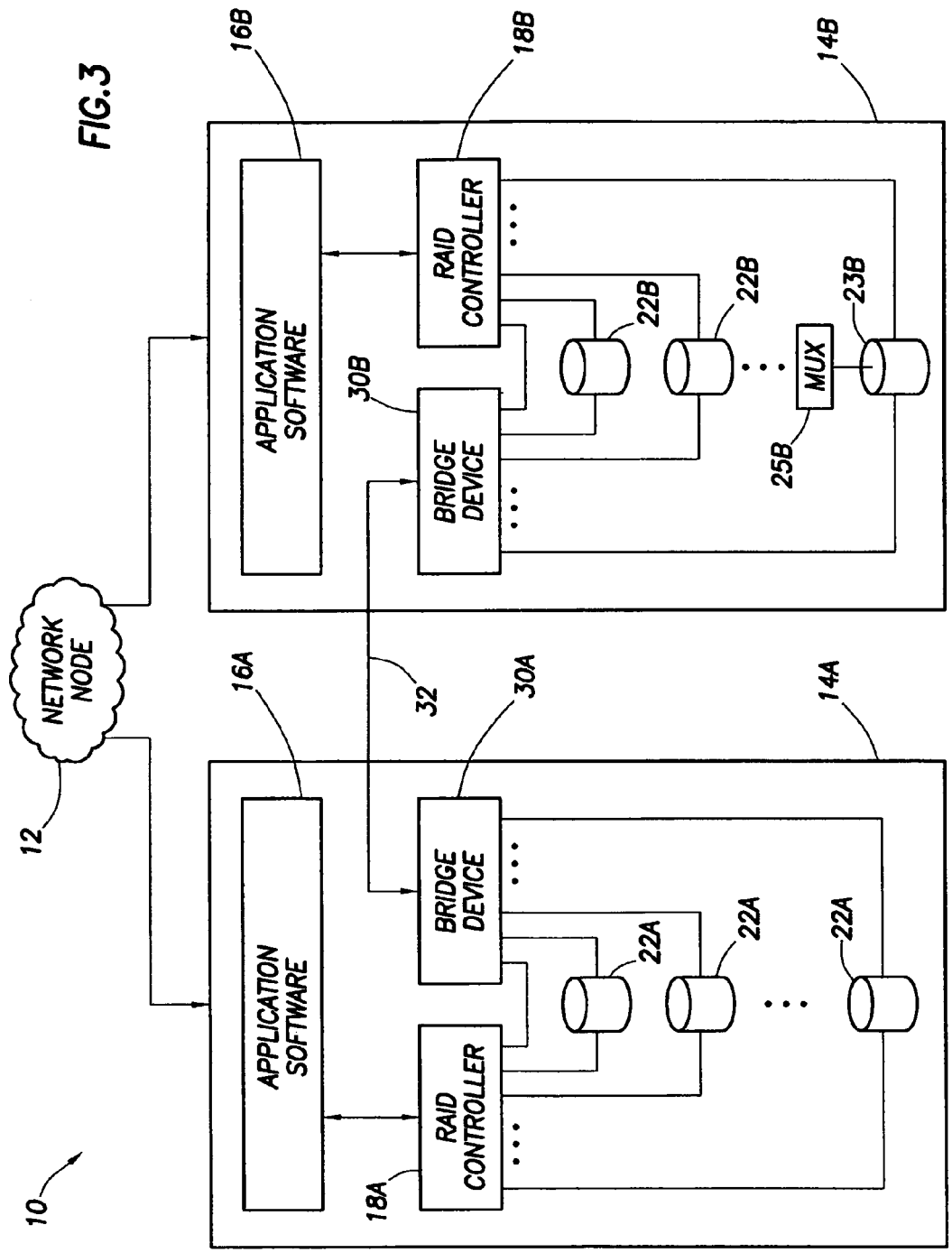
FIG. 3 is a diagram of a cluster network that does not include the presence of an SAS expander.

The invention disclosed herein is also applicable in a server node architecture that does not include the presence of an SAS expander as a data exchange between the RAID controller and the drives of the distributed storage array. As an example, SAS expanders are not included in the network architecture of FIG. 3. The RAID controllers of each of the server nodes of FIG. 3 are coupled directly to drives of the server nodes. In this example, each drive is dual ported, which is characteristic of SAS drives, and each drive is coupled between a RAID controller and a bridge device 30. Bridge device 30 may comprise a 4X SAS connector that serves as a link together the drives of each server node. Bridge device 30A of server node 14A is coupled to bridge device 30B of server node 14B through a communications link 32. Each bridge device provides a route to the peer bridge device in the peer server node of the network. Following a write to a drive of the server node, the RAID controller of the server node routes to the corresponding drive information concerning the write so that a mirrored write can be performed in the corresponding drive of the peer server node. The size or bandwidth of the communications link 32 and the associated bridge devices may limit the number of drives that may be coupled to the bridge device. In the case of 4X SAS connectors as bridge devices, a maximum of three drives could be included in each server node. Although the bridge device of FIG. 3 is shown as being two bridge devices 30A and 30B, each of which is locating in or near a respective server node, the bridge device of FIG. 3 could also comprise a single bridge device 30 located external to and in communication with each of the server nodes.

As an alternative to the use of dual ported SAS drives, the server nodes may use one or more SATA drives that include a multiplexer at the input of the SATA drive. The placement of the multiplexer at the input of the SATA drive permits the drive to operate as a dual ported drive. An example of this topology is shown in server node 14B. A SATA drive 23B is coupled to a multiplexer 25B, which is itself coupled to each of RAID controller 18B and bridge device 30B.

The network architecture and failure recovery technique disclosed herein has been described with respect to a cluster network that includes two network nodes. The network architecture and failure recovery technique disclosed herein may likewise be employed in a network that includes more than two nodes. In a network architecture having more than two nodes, SAS fanout expanders could be used as a central routing point between the nodes, routing writes and synchronizing recovery failure between the nodes so that a RAID Level 1 condition exists for each drive included in any of the server nodes.

Figure 4:
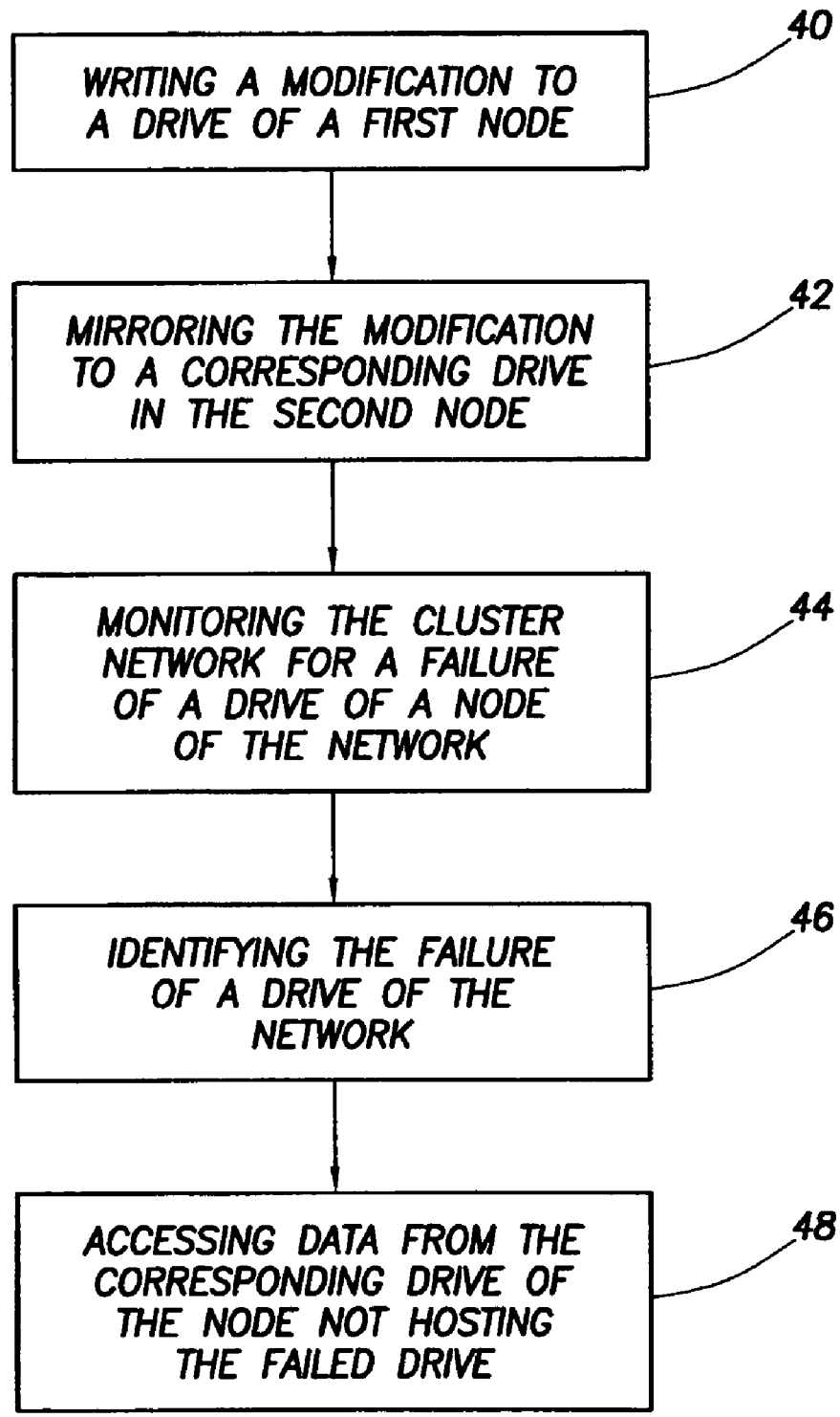
FIG. 4 is a flow diagram of method steps for mirroring data between corresponding nodes in the cluster network and for accessing data in a drive in the event of the failure of a node or a drive in a node of the cluster network

Shown in FIG. 4 is a series of method steps for mirroring data between corresponding nodes in the cluster network and for accessing data in a drive in the event of the failure of drive in one of the nodes of the cluster network. At step 40, a modification is written to a drive of a node, which for reference sake, is referred to in this example as a first node. To comply with RAID Level 1 storage scheme, the data written to the drive of the first node is mirrored at step 42 to a corresponding drive in the second node of the cluster network. Step 44 represents the continuous monitoring by the RAID controllers of the cluster network of failures in the drives of the nodes of the cluster network. Once a failure of a drive is recognized (step 46), the data residing in the failed drive is accessed by both the RAID controller of the first node and the RAID controller of the second node through the non-failing corresponding drive. As demonstrated in this example and in the architecture disclosed herein, the distribution of a RAID Level 1 architecture across the drives of a cluster network provides for a storage methodology in which data is replicated across a cluster network without the necessity of external storage. The method of FIG. 4 has been described with respect to a cluster network having two nodes. It should be recognized that the method of FIG. 4 could apply to a cluster network having more than two nodes.

Although the cluster network disclosed herein has been described with respect to RAID Level 1 storage methodology, it should also be recognized that other fault tolerant storage methodologies may be employed, especially storage methodologies that employ data mirroring as a basis for fault tolerance. As an example, the system and method disclosed herein could also be implemented with a distributed storage network that uses a RAID Level 10 storage methodology. Although the present disclosure has been described in detail, it should be understood that various changes, substitutions, and alterations can be made hereto without departing from the spirit and the scope of the invention as defined by the appended claims.

What is claimed is:

1. A cluster network, comprising:
   first node and a second node, each of the first and second nodes including,
      an instance of application software;
      a RAID controller operable to transmit data to and from the RAID controller;
      a SAS expander coupled to the RAID controller;
      a plurality of drives, wherein each of the plurality of drives is coupled via a serial point-to-point communications link to each of the SAS Expander and RAID controller; and
   a communications link coupled between the RAID controllers of each of the first node and the second node.

2. The cluster network of claim 1, wherein data is written to the plurality of drives on the first and second nodes according to a RAID Level 1 storage methodology.

3. The cluster network of claim 2, wherein each drive of the first node is associated with a drive in the second node.

4. The cluster network of claim 3, wherein a modification to the data of a drive of the first node causes the RAID controller of the first node to transmit data to the second node to cause a modification to the corresponding drive in the second node such that the data is replicated in the corresponding drive of the second node.

5. The cluster network of claim 4, wherein each of the first and second nodes are coupled to network node.

6. The cluster network of claim 4, wherein the SAS expander of the first node is coupled to the SAS expander of the second node.

7. The cluster network of claim 4, wherein the RAID controller of the first node can access data in a drive of the second node in the event of a failure of a corresponding drive in the first node.

8. The cluster network of claim 1, wherein data is written to the plurality of drives on the first and second nodes according to a RAID Level 10 storage methodology.

9. A method for failure recovery in a cluster network, comprising the steps of:
   providing first and second nodes of the cluster network, each of the first and second nodes of the cluster network including,
      an instance of application software,
      a RAID controller operable to receive data from the application software;
      a SAS expander coupled to the RAID controller; and
      a plurality of drives, wherein each of the plurality of drives is coupled via a serial point-to-point communications link to each of the SAS expander and RAID controller;
   providing a communications link between the RAID controller of the first node and the RAID controller of the second node;
   mirroring modifications to a drive of the first node or a drive in the second node to a corresponding drive in the first node or the second node; and
   monitoring the cluster network for a failure of a drive of the cluster network; and
   in the event of the failure of a drive of a node, accessing data from the corresponding drive of the node not hosting the failed drive.

10. The method for failure recovery in a cluster network of claim 9, wherein data is written to the plurality of drives on the first and second nodes according to a RAID Level 1 storage methodology.

11. The method for failure recovery in a cluster network of claim 10, wherein the content of each drive in the first node is replicated in a corresponding drive in the second node.

12. The method for failure recovery in a cluster network of claim 11, further comprising the step of providing a communications link between the SAS expander of the first node and the SAS expander of the second node.

13. The method for failure recovery in a cluster network of claim 9, wherein data is written to the plurality of drives on the first and second nodes according to a RAID Level 10 storage methodology.

14. A cluster network, comprising:
   first node and a second node, each of the first and second nodes including,
      an instance of application software;
      a RAID controller operable to transmit data to and from the RAID controller,
      a bridge device coupled to the RAID controller;
      a plurality of drives, each of the plurality of drives coupled via a serial point-to-point communication link to each of the RAID controller and the bridge device; and a communications link coupled between the bridge devices of each of the first node and the second node.

15. The cluster network of claim 14, wherein at least one of the drives of either of the first node or the second node is coupled to the bridge device of the node and the RAID controller of the node through first and second ports of the drive.

16. The cluster network of claim 15, wherein data is written to the plurality of drives on the first and second nodes according to a RAID Level 1 storage methodology.

17. The cluster network of claim 16, wherein the data in a drive in a first node is mirrored in a corresponding drive in the second node.

18. The cluster network of claim 17, wherein a modification to the data of a drive of the first node causes the RAID controller of the first node to transmit data through the bridge device to the second node to cause a modification to the corresponding drive in the second node such that the data is replicated in the corresponding drive of the second node.

19. The cluster network of claim 14, wherein at least one of the drives of the first node or the second node is coupled to a multiplexer having multiple ports, wherein one port of the multiplexer is coupled to the bridge device of the node, and wherein one port of the multiplexer is coupled to the RAID controller of the node.

20. The cluster network of claim 19, wherein data is written to the plurality of drives on the first and second nodes according to a RAID Level 1 storage methodology.

21. The cluster network of claim 20, wherein the data in a drive in a first node is mirrored in a corresponding drive in the second node.

22. The cluster network of claim 21, wherein a modification to the data of a drive of the first node causes the RAID controller of the first node to transmit data through the bridge device to the second node to cause a modification to the corresponding drive in the second node such that the data is replicated in the corresponding drive of the second node.

23. The cluster network of claim 14, wherein data is written to the plurality of drives on the first and second nodes according to a RAID Level 10 storage methodology.

24. A cluster network, comprising:
   first node and a second node, each of the first and second nodes including,
      an instance of application software;
      a RAID controller operable to transmit data to and from the RAID controller; and
      a plurality of drives, each of the plurality of drives coupled via a serial point-to-point communication link to each of the RAID controller and the bridge device;
   wherein the RAID controller of the first node is communicatively linked to a RAID controller of the second node through a bridge device.

25. The cluster network of claim 24, wherein data is written to the plurality of drives on the first and second nodes according to a RAID Level 1 storage methodology.

26. The cluster network of claim 25, wherein a modification to the data of a drive of the first node causes the RAID controller of the first node to transmit data through the bridge device to the second node to cause a modification to the corresponding drive in the second node such that the data is replicated in the corresponding drive of the second node.

27. The cluster network of claim 24, wherein data is written to the plurality of drives on the first and second nodes according to a RAID Level 10 storage methodology.

28. A method for failure recovery in a cluster network, comprising the steps of:
   providing first and second nodes of the cluster network, each of the first and second nodes of the cluster network including,
      an instance of application software,
      a RAID controller operable to receive data from the application software;
      a bridge device coupled to the RAID controller; and
      a plurality of drives, each of the plurality of drives coupled via a serial point-to-point communications link to each of the RAID controller and the bridge device;
   providing a communications link between the RAID controller of the first node and the RAID controller of the second node;
   mirroring modifications to a drive of the first node or a drive in the second node to a corresponding drive in the first node or the second node; and
   monitoring the cluster network for a failure of a node of the cluster network; and
   in the event of the failure of a node, accessing the resources of the failed node on the node not experiencing a failure.

29. The method for failure recovery in a cluster network of claim 28, wherein data is written to the plurality of drives on the first and second nodes according to a RAID Level 1 storage methodology.

30. The method for failure recovery in a cluster network of claim 29, wherein the content of each drive in the first node is replicated in a corresponding drive in the second node.

31. The method for failure recovery in a cluster network of claim 28, wherein data is written to the plurality of drives on the first and second nodes according to a RAID Level 10 storage methodology.

* * * * *